April 14, 1970    B. R. TOLLIVER ET AL    3,506,857
COMPRESSIVE MODE PIEZOELECTRIC TRANSDUCER WITH ISOLATION
OF MOUNTING BASE STRAINS FROM THE SIGNAL
PRODUCING MEANS THEREOF
Filed March 10, 1967

INVENTOR.
BILL R. TOLLIVER
LEONARD E. MAIER
BY
Christie, Parker & Hale
ATTORNEYS United States Patent Office 3,506,857
Patented Apr. 14, 1970

3,506,857
COMPRESSIVE MODE PIEZOELECTRIC TRANSDUCER WITH ISOLATION OF MOUNTING BASE STRAINS FROM THE SIGNAL PRODUCING MEANS THEREOF
Bill R. Tolliver, Dallas, Tex., and Leonard E. Maier, Monrovia, Calif., assignors, by mesne assignments, to Bell & Howell Company, Chicago, Ill., a corporation of Illinois
Filed Mar. 10, 1967, Ser. No. 622,309
Int. Cl. H01v 7/02
U.S. Cl. 310—8.4                          3 Claims

ABSTRACT OF THE DISCLOSURE

An instrument transducer including a strain-sensitive, signal producing movement, for example, a piezoelectric accelerometer, in which the movement is mounted within a housing relative to a mounting base defined by the housing so that strains developed in the base and the housing are essentially completely isolated from the movement and do not lead to the production of extraneous signals occasioned by environmental conditions and occurrences other than changes in the physical phenomenon to which the transducer is sensitive.

BACKGROUND OF THE INVENTION

Field of the invention

This invention relates to instrument transducers, and more particularly to such transducers so constructed that strains developed in the mounting bases or housings thereof in response to transducer environmental conditions and occurrences, other than those to which the transducer is expressly designed to be responsive, are essentially completely isolated from the transducer movements and cannot lead to the production of extraneous or spurious signals.

Description of the prior art

An instrument transducer is a device for producing a signal, preferably an electrical signal, having a value proportional to the value of a physical phenomenon, such as temperature, pressure, acceleration and the like, to which the transducer is sensitive. In many cases, as in piezoelectric devices and bonded and unbonded strain gage devices, the signals are produced by mechanisms (known as movements) which rely upon strain for their operation. In other instances, the movements do not rely upon strain for their operation but are strain sensitive in that a signal is produced as the movement is strained.

It is desired that the signal produced by the transducer be representative only of the value of the physical phenomenon desired to be measured. It has been found, however, particularly in the case of piezoelectric and other transducers relying upon strain to produce the desired signal, that spurious signals are produced by environmentally oriented strains developed in the transducer housings, particularly in the mounting bases of the housings. These strains are produced by temperature changes in the vicinity of the transducer and by strains developed in the structure to which the transducer is mounted. The isolation of such base and housing strains from the transducer movement is therefore desired so that the transducer functions independently of its environment except to the extent the transducer responds to the desired physical phenomenon. When such isolation is obtained, the signal is indicative of only the value of or variations in the value of the monitored phenomenon.

Prior art transducers do not isolate the signal producing movements from strains developed in the transducer bases, and thus such transducers, depending upon the types of movements used, are subject to the production of strain-induced signals which cannot be distinguished from the signals reflecting the condition of the monitored phenomenon.

The movements of instrument transducers may be either of the active type or of the passive type. An active movement generates the desired signal in the transducer, whereas a passive movement modulates or modifies an applied signal to produce the desired signal. A strain gage movement is of the passive type as it is essentially a variable impedance mechanism which functions to change a driving signal applied to it. A piezoelectric movement, on the other hand, is of the active type as it functions to generate a charge which is read as a voltage. This invention has utility in connection with both active and passive movements. Therefore, as used herein the term "signal producing movement" refers to active and passive transducer movements.

SUMMARY OF THE INVENTION

This invention provides a simple, effective, efficient and novel instrument transducer arrangement in which the signal producing movement of the transducer is mounted in the transducer relative to the transducer base by a connection structure which isolates strains developed in the base from the movement. Preferably, the connection structure also provides thermal and electrical isolation of the movement from the base and the transducer housing. The connection structure is arranged so as not to interfere with or detract from the operation of the movement relative to the monitored phenomenon.

The advantages and benefits provided by the invention are most readily discernible in a piezoelectric accelerometer, and such a transducer is described hereinafter as an illustrative vehicle for a detailed explanation of the invention.

Generally speaking, however, the invention provides an improvement in an instrument transducer having a casing defining a base, and a strain-sensitive signal producing movement in the casing, and means for mounting the base to a supporting structure. The improvement comprises strain isolation means mounting the movement relative to the base for isolation of strains in the base from the movement.

In the context of the present invention, a movement is said to be "strain sensitive" if strain developed in any aspect of the movement causes the movement to produce a signal of the type produced as the movement responds to the monitored physical phenomenon, whether the phenomenon be pressure, acceleration, or the like. A movement is said to be "strain responsive" if strain of one or more components of the movement must occur, and are in fact relied upon, to produce the desired signals related to the monitored phenomenon. Strain gage movements and piezoelectric movements are two examples of strain responsive movements. Manifestly, if a movement is strain responsive, it is also strain sensitive.

BRIEF DESCRIPTION OF THE DRAWING

The above-mentioned and other features of the invention are set forth in the following detailed description of a presently preferred embodiment of the invention, which description is presented with reference to the accompanying drawing wherein.

3

Figure 2:
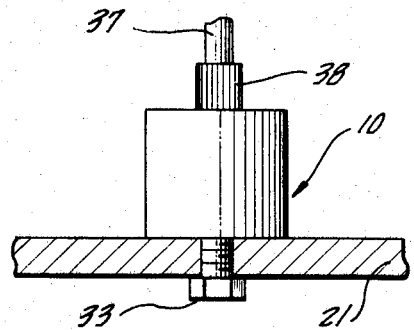
Figure 3:
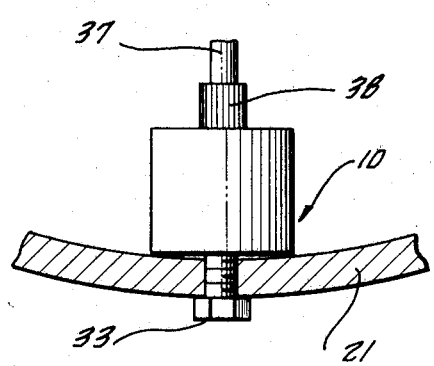

FIGS. 2 and 3 are similar elevation views of the accelerometer mounted to a supporting plate, the plate being shown in two states of flexure for the purposes of illustrating the environmental problems overcome by the invention.

DESCRIPTION OF THE PREFERRED EMBODIMENT

Figure 1:
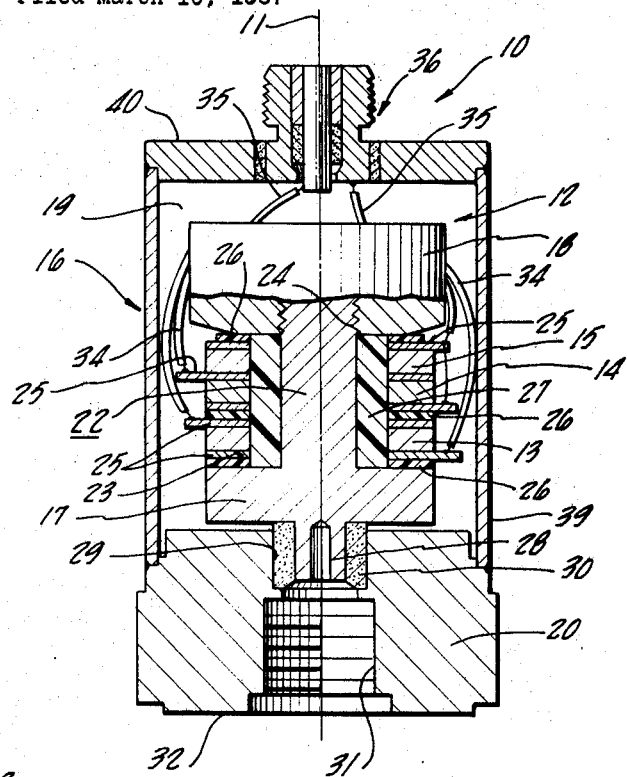
FIG. 1 is a cross-sectional elevation view of a piezoelectric accelerometer according to the invention.

A piezoelectric transducer 10, shown in FIG. 1, is designed to measure accelerations applied to the transducer in a direction along a sensitive axis 11; in transducer 10, the sensitive axis is also an axis of symmetry for the transducer. The tranducer movement 12 is of the active type and includes a temperature compensating capacitor 13 and a pair of piezoelectric crystals 14 and 15 disposed in series relative to each other within a transducer casing 16 between a support member 17 and a seismic mass 18. Movement 12 is arranged symmetrically about axis 11 so as to have its center of mass disposed on the axis. The movement is supported in a cavity 19 in the casing on a casing base 20 by which the transducer may be mounted to a support structure such as plate 21 shown in FIGS. 2 and 3. Because the transducer is especially suited to use in the sensing and measuring of acceleration, it is known as an accelerometer.

The capacitor and the crystals are annular in shape and are disposed in spaced concentric relation to a biasing rod 22 which extends along axis 11 from a planar surface 23 of the support member toward mass 18. The end of the rod opposite from the support member is externally threaded for cooperation with internal threads in a central bore 24 of the mass. The mass is screwed onto the rod sufficiently tightly to stress the rod a desired amount, and thereby apply a predetermined amount of compressive load to the crystals in a direction parallel to axes 11.

Conductive wafers 25 are disposed between and on opposite sides of the crystals and on opposite sides of the capacitor and provide connection points for the internal circuitry of the transducer. The mass and the support member are electrically conductive and, if desired, provide additional connection points in the transducer internal circuitry. The crystals are electrically conductive and, if desired, provide additional connection points in the transducer internal circuitry. The crystals are electrically insulated from rod 22 by a quantity of insulation 27 disposed circumferentially of the rod. Insulating wafers 26 are disposed between the mass and adjacent wafer 25, between the support member and adjacent wafer 25, and between the wafers 25 disposed between the capacitor and crystal 14. Any of the circuit configurations shown in Patents 3,400,284, 3,390,286, 3,389,276, 3,349,629 or in Patent 3,285,074 may be used without departing from the scope of the invention. Similarly, one, two, or any number of piezoelectric crystals may be utilized.

Support member 17 is mounted in fixed relation to casing base 20. A projection 28 extends from the support member along axis 11 away from rod 22. The projection is disposed in a recess 29 formed in base 20 concentric to the axis and has a diameter less than the diameter of the recess so that an anular gap is left between the projection and the surfaces of the base which define the recess. A quantity of rigid bonding material 30 fills the annular gap around projection 28 and secures the projection in fixed relation to the base in such a manner that the suppor member, except in the area of the projection, is spaced from the base in a direction parallel to axis 11. The diameter of the projection is a minor portion of the dimensions of the base and the support member in directions normal to the axis. Accordingly, the connection of the support member to the base is at essentially only a single point, which point is centered on axis 11.

It is preferred that the bonding material used to secure the support member projection in the base recess be a ceramic material which is rigid and which provides thermal and electrical insulation between the support member and the base. Preferably the bonding material is Ceramicite bonding and insulating material manufactured by Bell & Howell Company, the assignee of this invention.

In addition to defining recess 29, base 20 also defines an internally threaded hole 31 concentric to the axis and open to a flat exterior surface 32 of the housing, this surface being perpendicular to axis 11. The hole is provided for securing the transducer to a desired structure, such as plate 21, in which accelerations are to be measured.

Referring to FIGS. 2 and 3, transducer 10 is shown mounted to a plate 21 which may be a portion of a missile, for example, to be analysed for vibration. A threaded bolt 33 is passed through a hole in the plate and is engaged in hole 31 to secure the transducer to the plate. Assume that the plate vibrates so as to cause the plate to bow back and forth in a direction transverse to its normally planar extent, such direction being parallel to the sensitive axis of the transducer. As the plate vibrates, accelerations are imposed upon transducer base 20, and upon support member 17 of the transducer movement because the support member is mounted in fixed relation to the base. The seismic mass of the movement however, being mounted to the support member by compliant biasing rod 22, moves slightly relative to the support member along axis 11 in response to these accelerations. The motion of the mass relative to the support member produces proportional variations in the compressive loading upon crystal 14, 15. As noted above, these crystals are piezoelectric in nature, that is, they generate electrical charges across their opposite faces as they are deformed, and because the crystals have inherent capacitance, the charges are manifested as voltages developed across the crystals. Movement 12, therefore, functions in response to accelerations applied to the transducer in a direction along axis 11 to produce signals which have values proportional to the instantaneous values of the accelerations applied to the transducer.

The signals produced by crystals 14, 15 are applied via suitable conductors 34, connected to conductive wafers 25 and 26, to signal conditioning, amplifying and modulating electronic circuitry carried by mass 18. Such circuitry may be in accord with the disclosures of Patent 3,400,284 for example. The output signals produced by operation of this circuitry are applied via conductors 35 to the elements of a suitable connector, a portion of which is carried by casing 16 at 36. An electrical cable 37, equipped with cooperating connector structure 38, is relied upon to conduct the transducer output signals to suitable telemetry or readout equipment, as desired.

In addition to base 20, the casing of transducer 10 includes a cylindrical shell 39 which is welded at its lower end to the base and at its upper end to a casing cap member 40, the cap member defining a portion of connector 36.

The mounting of movement support member 17 to transducer base 20 via projection 28 and bonding material 30, being basically a single point connection with the support member spaced from the base, essentially entirely isolates the transducer movement from strains developed in the base or in the remainder of the transducer casing. As a result, the output signals produced by operation of the movement are essentially entirely the result of accelerations applied to the transducer in a direction along sensitive axis 11, and such signals have little, if any, portion thereof produced by or attributable to non-acceleratory conditions in the environment of the transducer.

An understanding of non-acceleratory environmental conditions previously productive of transducer output signals can be obtained from an inspection of FIG. 3 and of U.S. Patents 3,233,465 and 3,285,074, which patents illustrate standard piezoelectric accelerometer construction practice followed prior to the present invention. These patents show that previously it was accepted and standard practice to engage the piezoelectric crystals directly with the transducer base between the base and the mass.

As shown in FIG. 3, the accelerometer is securely bolted to plate 21 so as to avoid loosening of the transducer on the plate as the plate vibrates; such tightening of the transducer down to the plate produces some initial strain in the base. Further, as the plate vibrates it bends and flexes to assume a curvature like that shown in FIG. 3 (such curvature being exaggerated in FIG. 3 for the purposes of illustration), and this curvature produces additional cyclic strain in the base as the base attempts to conform to the surface of the plate. In the structures shown in the patents cited above, these strains are transmitted to and produce deformations in the crystals, and because the transducer movements are strain responsive, the transducers produce spurious output signals having no direct relation to the values of acceleration applied to the transducers.

Further, environmental temperature changes produce substantial deformation and strain of the structure to which the transducers are mounted and of the massive transducer bases. In the transducers shown in the cited patents, these temperaure-related strains produce spurious transducer output signals.

Transducer 10, however, provides a stress-isolating, single-point connection between the movement support member and the transducer base. This arrangement, in conjunction with the spacing of the support member from the base, means that the base can experience significant strain with essentially insignificant effect upon movement 12. Also, any temperature changes in the structure to which the transducer is mounted and in the transducer base are significantly isolated from the support member by bonding material 30. The electrically insulative bonding material also isolates the movement from electrical signals which may be applied to the base. As a result, the signals produced by operation of movement 12 are essentially entirely the result of accelerations applied to the transducer.

The center of mass of the movement is located on axis 11 so that there is no tendency for the movement to tilt relative to the connection between the support member and the base in response to accelerations applied along the axis.

A piezoelectric transducer (transducer A) in accord with the foregoing description, a similar transducer (transducer B) in which rod 22 extended directly from the base, and an equivalent transducer (transducer C) according to the description of U.S. Patent 3,233,465 were subjected to comparative tests. The test fixture was a 30 inch long strip of steel 2 inches wide and 0.075 inch thick. The strip was secured in cantilever fashion in a vise, about two inches of the length of the strip being engaged in the vise. Two bonded strain gages were applied to each side of the strip at locations centered 1.5 inches from the edge of the vise, i.e., from the fixed end of the cantilever beam. A mounting hole for the transducers was formed through the beam between the strain gages. The transducers were then mounted, in turn, to the beam and in each instance the beam was manually deflected until the strain gages showed a strain adjacent the transducer of $250\mu$ strains, i.e., $250 \times 10^{-6}$ inches/inch strain. At this strain level, transducer A developed an output signal equivalent to a 1G. applied acceleration, transducer B developed a signal equivalent to a 70G. applied acceleration, and transducer C developed an output signal indicative of a 55G, applied acceleration. Thereafter, these same transducers were subjected to a thermal shock test in which each transducer was dropped in water heated to a temperature 50° F. above room temperature. Transducer A developed an output signal equivalent to a 6.67G. applied acceleration, and the output signals developed by transducers B and C were equivalent to 800G. and 500G. applied accelerations, respectively.

Transducers in accord with this invention subsequent to the above-described test have even lower values of base-strain and thermal shock sensitivity.

In the event that thermal shock sensitivity is not a factor to be considered or reduced, base strain sensitivity of a transducer like that described above can be reduced substantially by making transducer base 20 and support member 17 integral; in this instance a deep groove, similar to the annular space between the opposing faces of the base and the support member about projection 28 as illustrated in FIG. 1, is machined in the single element to provide a small diameter, single point connection between the base and support member portions of the unitary member.

It is apparent from the foregoing that this invention produces significant improvements in instrument transducers utilizing strain-sensitive signal producing movements. The structural aspects of the invention are simple and economical to effect, and do not lead to an appreciable increase in the size or weight of the transducer.

What is claimed is:

1. In a piezoelectric accelerometer including a housing defining a base and an internal cavity, a seismic mass in the cavity in spaced relation to the base along a sensitive axis of the accelerometer, a piezoelectric crystal engaged with the mass on the side of the mass toward the base, and means engaged with the mass for biasing the mass toward the base and for imposing a predetermined load on the crystal in a direction along the sensitive axis, the improvement comprising a support member spaced along the sensitive axis from the mass and engaged with the side of the crystal opposite from the mass, a projection defined by the support member and extending along the sensitive axis away from the mass, the projection having a maximum dimension transverse to the axis substantially less than any corresponding dimension of the support member in a corresponding direction, a recess formed in the base circumferentially of the projection, and a quantity of ceramic material bonded between the projection and the base circumferentially of the projection in the recess and mounting the supporting member in spaced relation to the base in a direction along the axis, the biasing means engaged with the mass including a rod aligned with the axis and engaged between the support member and the mass.

2. In a piezoelectric accelerometer having a casing including a base adapting the casing to be mounted to a structure to be monitored for acceleration, and a compressive mode piezoelectric signal producing means in the casing for producing a signal indicative of the magnitude of accelerations applied to the casing along a sensitive axis of the accelerometer, the signal producing means including a seismic mass, a crystal support structure, a piezoelectric crystal effectively engaged between the mass and the support structure, the mass, the crystal, the crystal support structure, and the base being aligned along the sensitive axis, and means compressively biasing the crystal between the mass and the support structure, the improvement comprising means in the casing for isolating strains developed in the base from the signal producing means so that a signal produced thereby is indicative of essentially only the magnitude of accelerations applied to the casing along the sensitive axis, the strain isolation means including a connecting member between the base and the support structure in alignment with the sensitive axis and effectively spacing the support structure from the base in fixed relation to the base, the connecting member having a cross-sectional area in a plane normal to the sensitive axis substantially less than the area of the base in parallel planes.

3. An accelerometer according to claim 2 including a quantity of thermally and electrically insulative material bonding the connecting member to the base, the connecting member and the insulative material between the base and the crystal support structure collectively having a cross-sectional area in a plane normal to the sensitive axis substantially less than the area of the base in parallel planes.

(References on following page)

References Cited

UNITED STATES PATENTS

| | | | |
|---|---|---|---|
| 3,389,276 | 6/1968 | Gradin | 310—8.4 |
| 3,252,016 | 5/1966 | Hayer | 710—8.4 |
| 3,120,622 | 2/1964 | Dranetz | 310—8.4 |
| 2,808,522 | 10/1957 | Dranetz | 310—8.4 |
| 2,988,728 | 6/1961 | Marlow | 310—8.6 |
| 3,075,098 | 1/1963 | Shoor | 310—8.4 |
| 3,268,855 | 8/1966 | Hagey | 310—8.2 |
| 3,390,286 | 6/1968 | Gradin | 310—8.1 |
| 3,400,284 | 9/1968 | Elazar | 310—8.7 |
| 3,060,333 | 10/1962 | Bradley | 310—8.4 |
| 3,075,099 | 1/1963 | Shoor | 310—8.4 |
| 3,042,744 | 7/1962 | Shoor | 310—8.4 |
| 2,808,522 | 10/1957 | Dranetz | 710—8.4 |
| 2,972,006 | 2/1961 | Shoor | 310—8.4 |
| 3,453,457 | 7/1969 | Hayer | 310—9.1 |

J. D. MILLER, Primary Examiner

U.S. Cl. X.R.

310—8.7, 9.1